April 14, 1953
C. W. WATSON
2,635,110
REGENERATION OF HYDROCARBON SYNTHESIS CATALYSTS
Filed Nov. 26, 1946
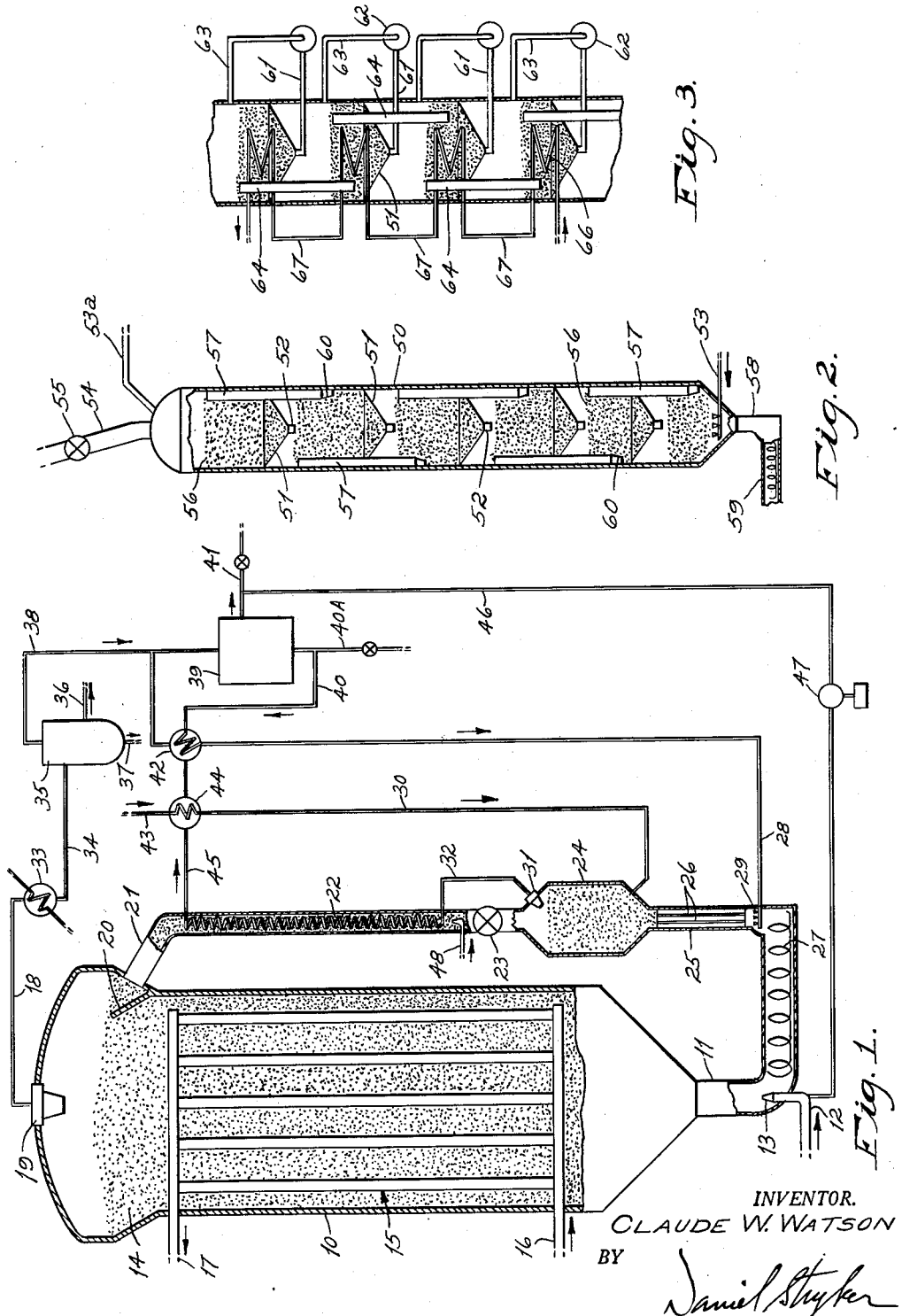
INVENTOR.
CLAUDE W. WATSON
BY
Daniel Stryker
ATTORNEY Patented Apr. 14, 1953

2,635,110

UNITED STATES PATENT OFFICE 2,635,110

REGENERATION OF HYDROCARBON SYNTHESIS CATALYSTS

Claude W. Watson, Scarsdale, N. Y., assignor to The Texas Company, New York, N. Y., a corporation of Delaware Application November 26, 1946, Serial No. 712,409

9 Claims. (Cl. 260—449.6)

The present invention relates to the synthesis of hydrocarbons as a result of the catalytic reduction of carbon oxide with hydrogen, and more specifically is concerned with the regeneration of the catalyst for the removal of objectionable deposits including elemental carbon.

In the known process of reacting a gaseous mixture of hydrogen and carbon oxide for the production of hydrocarbons of varying molecular size, a catalyst comprising a metal of the iron group such as cobalt, iron, nickel or ruthenium, is effective to reduce the carbon oxide with the direct desorption and evolution of the hydrocarbons. The character of the hydrocarbons, as is known, depends upon the catalyst employed and the pressure and temperature at which the reaction is carried out. The catalyst in question has however usually been characterized by a more or less rapid degeneration accompanied by accumulation of elemental carbon at conventional operating temperatures. Numerous treatments have been proposed for regenerating or revivifying the catalyst in order to place it in condition for further use.

It is an object of the present invention to provide an improved method of revivification wherein the catalyst may be readily treated to remove objectionable accumulations of elemental carbon and placed in a condition of good activity suitable for return to the synthesis reactor.

Another object of the present invention contemplates a revivifying treatment as above which is readily adapted to continuous operation without impairing the continuous use of catalyst in the reactor.

Other and further objects will be apparent from a consideration of the following disclosure.

In accordance with the present invention, the catalyst having accumulated an objectionable content of elemental carbon in the course of the normal synthesis reaction, is subjected to contact with carbon dioxide at high temperatures quite materially above the temperature of the synthesis reaction and at which carbon dioxide and carbon are favorably consumed with the production of carbon monoxide. The effluent gases are separated from the catalyst at said high range of temperature and the catalyst cooled and returned to the synthesis reactor in revivified condition.

I have observed that the formation of elemental carbon in the synthesis reaction results primarily from a condition represented substantially as follows:

$$2CO = CO_2 + C$$

At the familiar temperatures at which hydrocarbons are usually synthesized, as aforementioned, the foregoing decomposition of carbon monoxide proceeds readily under equilibrium conditions which render it impossible, for all practical purposes, to control the reaction. That is to say, it appears that in the presence of an iron catalyst operating at about 625° F. to synthesize essentially hydrocarbons boiling in the motor gasoline range, a minimum $CO_2$ to $CO$ ratio in the order of from 5000–6000 to 1 would be necessary to prevent formation of elemental carbon. At higher temperatures, however, equilibrium conditions alter, so that elemental carbon and carbon dioxide may be consumed with the formation of carbon monoxide.

The temperatures at which the carbon dioxide may be caused to react with carbon to form carbon monoxide, are advantageously substantially above conventional temperatures of hydrocarbon synthesis, preferably higher than 1000° F. and advantageously in the range of 1400° F. or 1500° F. and above. The upper limit of the range is controlled only by the adverse effect of high temperatures upon the catalyst. Obviously this will vary materially depending upon the character, and particularly the refractory properties of the catalyst in question. With catalysts which comprise essentially pure iron with conventional additions of activators and promoters, it has been found that temperatures materially above 1500° F. may tend to promote sintering.

Where finely powdered catalysts are desirable, as in operations employing the technique of fluidization, therefore, higher temperatures may be objectionable. With catalysts, however, including a highly refractory support such as silica gel or filter gel, upon which the active metal is deposited, somewhat higher temperatures may be appropriate. In any event, at temperatures of 1400° F. and above, it has been found that equilibrium will be reached with for example 80 to 90% of carbon monoxide in the gas. Therefore, with a feed of substantially pure carbon dioxide, the conversion of elemental carbon into carbon monoxide may be directed in a controlled manner such that any desired proportion may be separated from the catalyst.

In accordance with the present invention, it is therefore necessary to introduce the catalyst into the regeneration zone at the relatively high temperature mentioned. Stated in another way, the gaseous products of reaction must be withdrawn from the catalyst while in the selected range of regeneration temperature, because at lower temperatures the favorable equilibrium between carbon monoxide and carbon dioxide is upset. Therefore, the catalyst must be preheated from the temperature of the synthesis reactor up to the regeneration temperature, out of direct contact with the hot effluent gases from the regeneration zone.

While any suitable means may be provided for heating the catalyst to regeneration temperature, in view of the expenditure of thermal energy required, I prefer, for practical reasons of economy to preheat the catalyst by counter-current passage in indirect heat exchange with the hot effluent gases from the regeneration zone.

It is moreover desirable in operation of the present invention to supply some of the endothermic heat energy necessary for regeneration by direct combustion of a portion of the elemental carbon content in the presence of a controlled stream of oxygen. Where the synthesis process operates with a synthesis gas produced, for example, by partial combustion of a hydrocarbon gas and a relatively pure oxygen stream from an associated air fractionation and rectification system, a portion of such stream may be made available in the limited quantities required. This expedient obviates the necessity of external heating or preheating and contributes the thermal requirements of the endothermic reaction involved in the reaction of carbon dioxide with carbon. On the other hand, the external heat requirements may be made up from any feasible source.

The major portion of the carbon dioxide necessary for the regeneration step is most advantageously supplied as a separate stream derived from the synthesis reaction. As is well known, carbon dioxide forms a more or less inevitable, advantageously minor by-product of the process capable of being readily separated from the product gases. Moreover, the stream of carbon dioxide can be preheated to reaction temperature by direct countercurrent passage in heat exchange relation to the regenerated catalyst, thus returning to the system the sensible heat supplied in preheating the catalyst and lowering the final catalyst temperature to the range appropriate for the hydrocarbon synthesis step.

In order to illustrate the invention more specifically, reference is made to Figure 1 of the accompanying drawings, wherein one preferred embodiment of the invention is illustrated more or less diagrammatically.

In accordance with the arrangement shown, the numeral 10 represents a synthesis reactor of conventional form having a cylindrical body portion terminating at its lower extremity in a standpipe 11. Synthesis gas comprising essentially carbon monoxide and hydrogen, for example, is introduced from any suitable source, not shown, through an inlet conduit 12 terminating in an injector nozzle 13 which directs the stream of reactant feed gases upwardly through a mass of catalyst 14 in the reactor.

Cooling means 15 comprising a heat exchanger of any conventional form is immersed in the mass of catalyst, as shown, and is adapted to be supplied with a coolant circulated inwardly through inlet pipe and header 16 and discharged by way of outlet pipe and header 17. While in the embodiment shown, the cooling surfaces of the heat exchanger comprise a series of vertically extending pipes, obviously the cooling means may take any conventional form capable of abstracting the exothermic heat of reaction from the surrounding catalyst and maintaining the contents of the reactor at any desired temperature level. The upper portion of the reactor is connected with an outlet conduit 18 receiving the gaseous reactants through a filter element 19 which may be formed of alundum or any other suitable porous, refractory material operative to pass the gaseous reactants to the pipe 18 free of entrained solid particles. Obviously, equivalent separating means may be employed such as cyclone, magnetic or electrostatic separators.

In accordance with the present embodiment, the catalyst takes the form of a fine powder held in a condition of uniform aeration by the upward flow of reactant gases. More specifically, the catalyst is maintained in the well known state of dense phase fluidization, wherein the individual particles are suspended or buoyed up in the gaseous flow for random movement, and the entire mass of powder assumes a condition analogous in appearance to that of a boiling liquid. Under these conditions, as is also known, reaction temperatures may be controlled within narrow limits and the reactants contacted with the catalyst for any predetermined time.

Referring now more particularly to the catalyst regeneration system, it will be noted that the reaction vessel is provided at its upper portion with a baffle wall 20 forming a hopper communicating with a standpipe 21. Catalyst flows over the upper margin of the baffle 20 and downwardly through the standpipe 21 past the heat exchanger coil 22, hereinafter described more in detail. In its passage down the standpipe, the catalyst is heated from the reaction temperature of the reactor 10; e. g., 400° F. to 650° F., to a substantially elevated temperature, as for example, 1200° F. to 1300° F., or higher. Rate of flow of the catalyst through the standpipe is controlled by a suitable mechanical feeder such as a star feeder 23 located at its lower extremity and discharging into regenerating chamber 24. The bottom of the regenerating chamber in turn discharges into the elongated standpipe 25 which in the embodiment shown is provided with a multiplicity of baffles or partitions 26, between which the particles move downwardly into the vicinity of screw conveyor 27. The screw conveyor 27 in turn conducts the regenerated catalyst back to standpipe 11, where it is picked up by the injector 13 and redirected into the reactor 10.

During passage of the catalyst through the lower standpipe 25, it is subjected to the upward countercurrent flow of a supply of substantially pure carbon dioxide introduced from pipe 28 through a distributing header 29. The carbon dioxide, introduced at any suitable temperature below the temperature of the reactor 10, moves upwardly in countercurrent heat exchange relationship to the downflowing catalyst and through the regeneration zone 24. A stream of preferably pure oxygen is supplied through the pipe 30 to the lower portion of the regeneration vessel 24 in sufficient quantity to maintain the temperature required in said vessel.

In the operation of the foregoing arrangement, as thus far described, the carbon dioxide reaches the lower portion of the vessel 24 after indirect countercurrent heat exchange with the downflowing catalyst. A suitable elevated temperature is maintained in the regeneration vessel 24 by control of the oxygen stream supplied through pipe 30 at such a relative rate as to controlledly burn carbon from the catalyst. Accordingly, therefore, in the vessel 24 the catalyst is subjected to contact for any predetermined period of time and at the predetermined elevated temperature with carbon dioxide which consumes the residual, unburned, elemental carbon with the liberation of carbon monoxide. The effluent stream of carbon monoxide, together with residual carbon dioxide is removed at the elevated reaction temperature, passing through a filter 31 to an outlet 32 and thence directly to the indirect heat exchanger 22. Accordingly, therefore, the hot gaseous products of reaction pass in countercurrent heat exchange relation to the incoming catalyst, progressively heating it to a temperature closely approximating the temperature of the vessel 24.

With more particular reference to the origin of the several gaseous streams, it will be noted that the synthesis reactor outlet conduit 18 discharges through a condenser 33 and a pipe 34 into a separator 35, from which a normally liquid hydrocarbon layer is conducted through outlet 36 to any suitable means for further treatment or recovery. A condensed water layer is discharged at the bottom through pipe 37. A normally gaseous fraction, usually consisting of gaseous hydrocarbons, carbon dioxide and possibly unreacted carbon monoxide and hydrogen is taken overhead through pipe 38 to a conventional gas recovery plant 39 operating for the recovery of carbon dioxide. The gas recovery means 39 may consist of any conventional instrumentality, such as the well known Girbitol process, operating to supply substantially pure carbon dioxide through outlet pipe 40 and to discharge the other separated gases through pipe 41. The carbon dioxide in pipe 40, after withdrawal of any excess via valved pipe 40A, passes through a heat exchanger 42 in indirect heat exchange relationship to the effluent gases of regeneration, and in the somewhat preheated condition is discharged through the aforementioned pipe 28 to the lower portion of the standpipe 25. The oxygen stream introduced through pipe 43 from any suitable source, not shown, passes through heat exchanger 44, where it is preheated in indirect exchange relation with the effluent regeneration gases, and is discharged by the aforementioned pipe 30 to the lower portion of the regenerator 24. The effluent gases from the heat exchange coil 22 are conveyed successively through exchangers 44 and 42 by means of pipe 45 which connects with pipe 38 leading to the gas recovery plant 39.

Since the products discharged through outlet pipe 41 of the gas recovery plant may comprise carbon monoxide, hydrogen, unsaturated gases and other products suitable for return to the synthesis reactor, a branch pipe 46 provided with a pump 47 permits recycling of all or any predetermined portion of this stream to the synthesis gas inlet pipe 12, as shown.

Thus, carbon dioxide recovered from the reaction products of the synthesis reactor is first preheated by exchange with gaseous products of regeneration and later passed in countercurrent heat exchange relationship to the catalyst in the standpipe 25, where it is further preheated to the temperature of the regenerator 24 while cooling the catalyst from standpipe 25 to a temperature suitable for return to the synthesis reactor 10. In the vessel 24 this gas, together with the carbon dioxide resulting from the combustion of oxygen proceeds to go to equilibrium with completion of the reaction whereby carbon monoxide is formed. The gaseous effluent is employed to preheat the incoming stream of catalyst to reaction temperature and discharged at a temperature of somewhat above the initial temperature of the incoming catalyst to preheat the oxygen and carbon dioxide streams.

Advantageously, therefore, preheating of the carbon dioxide stream in exchanger 42 may be to a temperature about, or just below the operating temperature of the reactor 10, with a sufficient differential so that catalyst entering pipe 11 is about or below reaction temperature.

With particular reference to certain practical details of the apparatus, it should be noted that the relative arrangement of standpipe 21 and coil 22 is selected for efficient countercurrent, indirect thermal exchange between the hot effluent gases and the incoming catalyst. While many arrangements will suggest themselves for this purpose, it is to be noted that I employ a relatively narrow standpipe in which the catalyst makes good contact with the heating surfaces. A restricted flow of carbon dioxide, from a source not shown, introduced through pipe 48 at a temperature of for example 1400° F., may be used to aerate the fine powder and thus promote heat exchange. While an excessive flow of this gas may agitate the powder to the point of preventing good countercurrent exchange, a more restricted flow, as is known, in a standpipe of limited, lateral dimension will permit dense phase fluidization with a good vertical heat gradient and without substantially upsetting the countercurrent, indirect heat exchange effect.

In other embodiments, however, designed for good heat transfer and flow of solids, fluidization may be omitted or a suitable vibrating means may, as is known in the art, be attached to standpipe 21 to promote regular flow of the solid powder.

The heat exchanging system defined by the standpipe 25 operates in a manner analogous to the foregoing by separating the downflowing catalyst powder into a plurality of streams which, even in a condition of good fluidization, maintain a temperature gradient favorable to good heat transfer in the presence of the upflowing cooling gas. This is achieved by the partitions 26 which include additional partitions similarly spaced, extending laterally in intersecting relation to those indicated. The standpipe is thus divided into a plurality of vertical passages of rectangular section. As is well known in the art, by such means, a gas may be readily preheated to the initial temperature of the catalyst, while the latter is discharged at a temperature closely approximating that of the incoming gas.

A suitable alternative form of countercurrent heat exchanger is shown more or less diagrammatically in Figure 2 of the drawings wherein the numeral 50 designates an upstanding tubular vessel divided into a series of catalyst zones by vertically spaced, funnel shaped partitions 51 each terminating at its lower extremity in a tube or orifice 52. In operation, the gas to be heat exchanged is introduced from any convenient source not shown, through the distributing head 53 and is withdrawn through outlet 53a after passing upwardly, successively through the several beds of catalyst and the intervening orifices 52, maintaining each bed in fluidized condition.

Catalyst is introduced to the topmost zone through inlet pipe 54 controlled by a feeder 55 and rises to the fluidized level 56 controlled by standpipe 57. Excess catalyst overflows into standpipe 57 and is conducted to the succeeding bed of catalyst. With catalyst continually introduced, as described, and discharged at a coordinated rate through outlet pipe 58 controlled by feeder 59 the catalyst beds will assume the operating levels shown, the particles following a progressive path downwardly at any desired temperature differential. It is advantageous to constrict the lower extremity of each standpipe 57 somewhat as indicated at 60 so as to maintain a fluidized head of catalyst in the standpipe at all times sufficient to balance the operating pressure drop between successive catalyst beds.

A somewhat analogous alternative suitable for indirect countercurrent heat exchange between a fluidized solid and a gas or liquid is shown in Fig. 3 wherein a tubular heat exchange tower otherwise constructed as in Fig. 2 is shown fragmentarily. Herein funnel shaped partitions 51 connect at their lower orifices with a recirculating line 61 including pumps or fans 62 adapted to circulate a suitable, preferably inert gas through pipe 61 and thence upwardly through the catalyst bed to maintain good dense phase fluidization. Effluent gases are collected and returned to the circulating means via pipe 63 which may be provided with a filter or other separating means, not shown, to remove entrained particles of catalyst. Standpipes 64 permit downward migration of catalyst as before and preferably each of the circulating means 62 operates at about the same pressure differential so that catalyst migration is not impaired.

The fluid to be heat exchanged is introduced from any source not shown, at the lower portion of the tower, to lowermost heat exchanging tubes 66 and from there passes by intervening connectors 67 to successive coils 66 arranged in series. Obviously, exchangers or tubes 66 may take any familiar form adapted to present adequate heat exchange surfaces to the fluidized solid powder.

According to one example submitted by way of illustration, catalyst is continuously withdrawn from the reaction zone of a synthesis reactor operating with an iron catalyst at a pressure of 200 pounds per square inch gauge, and a temperature of 625° F. for the production of hydrocarbons essentially in the motor gasoline boiling range.

The catalyst consists of metallic iron, containing about 1% potassium oxide ($K_2O$) and about 2% alumina ($Al_2O_3$), in a finely powdered form passing 200 mesh screen, about 65% passing 325 mesh screen, and in the state in which it is withdrawn from the reactor contains approximately 25% by weight of carbon.

Catalyst is withdrawn at the rate of approximately 150 pounds per hour and at a temperature of 625° F. and progressively preheated to a temperature of 1340° F. The preheated catalyst is continuously discharged into a regeneration vessel operating at a temperature of 1520° F. The regeneration vessel contains catalyst maintained in a state of dense phase fluidization by an incoming flow of carbon dioxide into which is injected a separate flow of oxygen of 98% purity. The catalyst is continuously withdrawn from the lower extremity of the chamber. The oxygen is preheated to a temperature of about 800° F. and the carbon dioxide to a temperature of about 1500° F. The gases pass upwardly through the catalyst at a linear velocity sufficient to maintain the catalyst in the state of dense phase fluidization aforementioned. The gaseous effluent from the contact mass is withdrawn directly from the regeneration zone at the aforesaid reaction temperature.

With more particular reference to the quantity and character of reactants, the oxygen, preheated as aforementioned, is introduced into the regeneration chamber at the rate of approximately 0.55 pound mols per hour. Concurrently therewith the substantially pure carbon dioxide is introduced at the rate of approximately 1 pound mol per hour. The catalyst entering the regeneration chamber and containing about 25% carbon appears to reach the internal temperature of 1520° F. immediately. Pressure in the regeneration zone is maintained at 200 pounds per square inch gauge.

The composition of the gas withdrawn from the top portion of the regeneration zone after passage through the catalyst is substantially as follows:

| | Per cent |
|---|---|
| $CO_2$ | 12.9 |
| $CO$ | 87.1 | and is evolved at the molar rate at about 0.35 mol of $CO_2$ per hour and 2.4 mols of $CO$ per hour.

The cooled catalyst discharged from the regeneration zone contains only about 10% of carbon, being in suitable condition for return to the synthesis reactor.

In accordance with another example, proceeding under substantially the same conditions as the foregoing, the several reactants are subjected to heat exchange in accordance with the principle set out in the embodiment disclosed in the drawing. In accordance with this example, the hot gases, at a temperature of 1520° F., evolved from the upper portion of the reaction zone are passed through a heat exchanger immersed in the catalyst stream from the synthesis reactor, and prior to introduction into the regeneration zone, the heat exchanger and stream of catalyst being so arranged as to secure a countercurrent, indirect exchange of thermal energy. In the course of this heating step, the temperature of the catalyst is raised to 1340° F. and the gases are discharged from the heat exchanger at a final temperature of 860° F. These are in turn heat exchanged by indirect means with the incoming streams of oxygen and carbon dioxide, raising the temperature of the former as high as possible and the latter to about 650° F. The oxygen stream is fed directly to the lower portion of the regenerating zone at this temperature, whereas the carbon dioxide stream is introduced into the lower portion of a standpipe containing a vertically extending column of catalyst withdrawn from the bottom of the regenerating zone. The carbon dioxide is, by this means, raised from an initial temperature of about 650° F. to a temperature which presumably reaches 1520° F. by the time it arrives at the regeneration zone. The carbon dioxide stream is derived from a gas purification plant receiving the normally gaseous products from both the synthesis reactor, and the residual gaseous effluent discharged from the regeneration zone after passage through the heat exchange means previously mentioned.

When operating in accordance with this example, the catalyst discharged from the aforementioned standpipe has substantially the same composition as mentioned in the earlier example, as well as a temperature of about 690° F. This is cooled to 600° F. and reintroduced into the synthesis reaction zone for the purpose of synthesizing hydrocarbons.

While the foregoing examples have been concerned with processes employing iron catalyst, the invention is applicable, though in a more restricted aspect, to other hydrocarbon synthesis catalysts, such for example, cobalt, nickel and ruthenium or any other metals of the iron group which may be used for this purpose.

It is apparent from the foregoing, that the several streams of reactants may be subjected to heat exchange in any desired manner, so that the thermal efficiency indicated is not impaired. While this obviously does not require the specific methods or sequence of heat interchange herein mentioned, it is advisable to utilize reaction heat to bring the catalyst to the required regeneration temperature, and then abstract the sensible heat of the regenerated catalyst in furtherance of the reaction. The incoming streams of gaseous reactants may acquire their necessary heat from any appropriate portion of the system wherein excess heat energy is available.

As indicated above, the catalyst may comprise any typical form, as for example the elemental metal previously referred to and the like.

While the use of pure oxygen in the regeneration zone is of obvious advantage, particularly where such a stream is available, the invention is not limited in this respect, and may employ any oxygen containing gas such as air. Somewhat the same statement is true of the carbon dioxide provided that in both cases the diluting gases are inert and incapable of impairing the process of regeneration. It is, of course, advantageous and advisable to employ gaseous feeds to the generator free from any substantial portion of carbon monoxide, although it will be evident from the foregoing that the process will still be operative with relatively high concentrations of carbon dioxide greater than that of the final equilibrium at the regeneration temperature selected. The presence of small proportions, as for example, 2% of hydrogen in the carbon dioxide feed is usually beneficial. The moisture content is best maintained as low as possible, for example, not more than 0.01%.

Obviously, from the foregoing, it will be apparent that the requirements of oxygen and carbon dioxide for conversion of the elemental carbon will be increased as the temperature at which the decarbonization is carried out is lowered within the range heretofore mentioned. Conversely, an increase in the temperature above that represented in the specific example will result in a decreased requirement. Moreover, in respect to pressures, it should be noted that a decrease in pressure favors catalyst regeneration.

High pressures do not seriously impair the reaction, as indicated in the second example above. This is of particular advantage in permitting continuous recycling of the catalyst from a synthesis reactor operating at the high pressures which prevail in accordance with many of the processes with which I am familiar. In other words, it is possible to operate the regeneration zone at a temperature corresponding to the pressure in the synthesis reactor, so that the catalyst may be freely handled without the serious problems which normally attend the transfer of materials between zones of widely varying pressure. On the other hand, where possible, it is desirable to use low pressures in the order of atmospheric and thereabouts.

While the foregoing disclosure discusses the maximum regeneration temperatures in terms of catalyst sintering, there are many processes known in the art for the catalytic synthesis of hydrocarbons which require the use of sintered catalyst, and in these, sintering, unless excessive, is not objectionable. In fact, a normal tendency toward excessive subdivision of catalyst particles in the reaction zone may be advantageously overcome by controlled sintering and agglomeration into somewhat larger particles. In this connection it is usually of advantage to operate the regenerating vessel at such a lineal upward flow of reactant gases that the catalyst is thoroughly aerated and fluidized. Under these conditions any tendency of the powder to agglomerate by sintering is largely overcome.

When catalyst regeneration is carried to the point where oxidation of the iron, for example, becomes excessive, the invention contemplates its reconditioning prior to return to the synthesis reactor. Thus in such cases, the regenerated product may be reduced with hydrogen and thereafter conditioned with a stream of synthesis gas until a good state of settled catalytic activity results. Reduction and conditioning may follow conventional procedure.

As will be evident to those skilled in the art, the invention does not necessarily require application of the technique of fluidization, and is obviously applicable to fixed bed, moving bed, or other operations from which catalyst can be withdrawn by any conventional means and contacted, as above, with carbon dioxide feed gas for a sufficient length of time at the proper regeneration temperature. Alternatively the catalytic synthesis operation may be shut down and the catalyst treated in accordance with the teachings of the present invention.

Many other specific modifications and adaptations of the present invention will be obvious to those skilled in the art from a consideration of the foregoing more or less exemplary disclosure, and it is therefore understood the invention is not limited to any such details except as defined by the following claims.

I claim:

1. In the synthesis of hydrocarbons by the catalytic reduction of carbon oxide with hydrogen in a synthesis reaction zone in the presence of a solid particle catalyst under conditions including an elevated synthesis temperature at which desired hydrocarbons are directly formed with the production of by-product carbon dioxide and the progressive contamination of the catalyst with an objectionable accumulation of elemental carbon, the improvement which comprises limiting the accumulation of elemental carbon by withdrawing from the synthesis reaction zone catalyst contaminated with elemental carbon, conveying said withdrawn catalyst successively through a preheating zone, a regeneration zone and a catalyst cooling zone, subjecting a dense fluid phase of said catalyst in said regeneration zone to contact with carbon dioxide at a temperature maintained in the range above about 1000° F., and in a concentration at which said carbon dioxide substantially consumes elemental carbon in the formation of carbon monoxide, separating product gases from contact with the catalyst at a temperature within said range, preheating the catalyst in the preheating zone by indirect heat exchange with the said product gases, preheating said carbon dioxide prior to introduction to the regeneration zone by direct exchange with hot catalyst in the catalyst cooling zone, introducing molecular oxygen into said regeneration zone in a limited proportion effective to maintain the temperature in said elevated range and returning catalyst from the cooling zone to the reaction zone.

2. The method according to claim 1, wherein carbon dioxide supplied to the regeneration zone is derived by recovery, as a substantially pure stream, from the effluent products of the synthesis reaction zone and wherein the effluent carbon monoxide from the preheating zone is supplied as a supplemental feed to the synthesis reaction zone.

3. In the synthesis of hydrocarbons by the catalytic reduction of carbon monoxide with hydrogen in a reaction zone in the presence of a solid particle catalyst comprising a metal of the iron group at an elevated temperature of about 400–650° F. at which the catalyst becomes contaminated with a deposit of elemental carbon, which impairs catalytic activity, the improvement which involves continuously maintaining catalyst activity in the reaction zone by subjecting a withdrawn stream of the catalyst particles containing elemental carbon to contact in a gasification zone with a stream of substantially pure, preheated carbon dioxide at a gasification temperature maintained substantially above 1000° F. at which solid, elemental carbon is gasified by substantial concentrations of carbon dioxide to form a product gas rich in carbon monoxide, effecting substantial gasification of the elemental carbon from the catalyst particles within said gasification zone, withdrawing said product gas stream of carbon monoxide from contact with the catalyst at a temperature not substantially below said gasification temperature such that redeposition of elemental carbon is prevented, introducing thus treated catalyst and said withdrawn product gas stream of carbon monoxide to the reaction zone to produce additional hydrocarbon products, and continuously preheating the catalyst particles and the substantially pure stream of carbon dioxide substantially to said gasification temperature prior to introduction into said gasification zone, by passing said catalyst particles in indirect heat exchange relation with the hot withdrawn product stream of carbon monoxide issuing from the gasification zone, simultaneously passing the stream of carbon dioxide in direct, countercurrent heat exchange relation with the hot, treated catalyst withdrawn from the gasification zone, thereby reducing the temperature of the treated catalyst to a level suitable for reintroduction to the reaction zone, and burning a portion of said elemental carbon in said gasification zone with elemental oxygen in a regulated quantity only sufficient to maintain the said gasification temperature therein.

4. The method according to claim 3 wherein said gasification temperature is substantially above 1400° F.

5. The method according to claim 3 wherein said gasification temperature is substantially above 1400° F., but below the temperature at which catalyst sintering occurs.

6. The method according to claim 3 wherein the catalyst particles comprise an iron synthesis catalyst.

7. The method according to claim 3 wherein said substantially pure stream of carbon dioxide comprises a small proportion of hydrogen not greater than about 2% and wherein the moisture content of said stream is not substantially greater than about 0.01%.

8. In the synthesis of hydrocarbons by the catalytic reduction of carbon oxide with hydrogen in a synthesis reaction zone in the presence of a solid particle catalyst under conditions including an elevated synthesis temperature at which desired hydrocarbons are directly formed with the production of by-product carbon dioxide and the progressive contamination of the catalyst with an objectionable accumulation of elemental carbon, the improvement which comprises limiting the accumulation of elemental carbon by withdrawing from the synthesis reaction zone catalyst contaminated with elemental carbon, passing said withdrawn catalyst into a regeneration zone, subjecting said catalyst in said regeneration zone to contact with carbon dioxide at a temperature maintained in the range above about 1000° F., and in a concentration at which said carbon dioxide substantially consumes elemental carbon in the formation of carbon monoxide, separating product gases from contact with the catalyst at a temperature within said range, preheating said withdrawn catalyst prior to passage into said regeneration zone by indirect heat exchange with the said product gases, preheating said carbon dioxide prior to introduction to the regeneration zone, supplying to the regeneration zone molecular oxygen in a limited amount effective to maintain the temperature of said zone in said range, and returning catalyst from the cooling zone to the reaction zone.

9. In the synthesis of hydrocarbons by the catalytic reduction of carbon monoxide with hydrogen in the presence of a solid particle catalyst at an elevated temperature of about 400–650° F. at which desired hydrocarbons are formed with progressive contamination of catalyst by carbonaceous deposits, the improvement which comprises limiting the accumulation of said carbonaceous deposits by periodically subjecting said catalyst to contact with carbon dioxide at a temperature maintained above about 1000° F. in a concentration at which the carbon dioxide reacts with elemental carbon to form carbon monoxide, withdrawing the resulting product gases from contact with the catalyst at a temperature not below about 1000° F., preheating the catalyst to at least about 1000° F. prior to said contact with carbon dioxide by passing said hot, withdrawn, high temperature gases in indirect heat exchange relationship therewith and incorporating molecular oxygen in said carbon dioxide contacted with the catalyst in a limited amount effective to maintain the temperature of contact within said range above about 1000° F.

CLAUDE W. WATSON.

References Cited in the file of this patent

UNITED STATES PATENTS

| Number | Name | Date |
|---|---|---|
| 987,147 | Loiseau | Mar. 21, 1911 |
| 2,185,989 | Roberts, Jr. | Jan. 2, 1940 |
| 2,261,151 | Fast | Nov. 4, 1941 |
| 2,284,603 | Belchetz et al. | May 26, 1942 |
| 2,289,731 | Roelen et al. | July 14, 1942 |
| 2,350,730 | Degnen et al. | June 6, 1944 |
| 2,393,909 | Johnson | Jan. 29, 1946 |
| 2,400,075 | Claussen | May 14, 1946 |

OTHER REFERENCES

Haslam et al., "Fuels and their Combustion," 1st ed., 1926, page 137, McGraw-Hill Book Co.

Barbor et al., "General College Chemistry," pages 428–29, Crowell 1940.